(12) United States Patent
Guenter (10) Patent No.: US 7,158,685 B2
(45) Date of Patent: Jan. 2, 2007

(54) DEMOSAICING GRAPHICAL CONTENT

(75) Inventor: Brian Kevin Guenter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 10/185,073

(22) Filed: Jun. 28, 2002

(65) Prior Publication Data

US 2004/0001641 A1   Jan. 1, 2004

(51) Int. Cl.
*G06K 9/40* (2006.01)

(52) U.S. Cl. .................. 382/261; 382/268; 382/269

(58) Field of Classification Search ............. 382/261, 382/268–269
See application file for complete search history.

(56) References Cited

U.S. PATENT DOCUMENTS

| | | | | |
|---|---|---|---|---|
| 3,987,065 | A | 10/1976 | Dennis et al. | 260/348 R |
| 6,618,503 | B1 * | 9/2003 | Hel-or et al. | 382/167 |
| 6,819,801 | B1 * | 11/2004 | Kakarala et al. | 382/240 |
| 6,989,862 | B1 * | 1/2006 | Baharav et al. | 348/273 |
| 7,006,686 | B1 * | 2/2006 | Hunter et al. | 382/162 |

OTHER PUBLICATIONS

Pavlovic et al., An Integrated Framework for Adaptive Subband Image Coding, Apr. 1999, IEEE Transactions on Signal Processing, vol. 47, No. 4, 1024-1038.*

Sun, Anthony, "A System: The Digital Camera", *ELE 201*, Jan. 11, 2002, 1-6.

Brainard, D.H. et al., "Reconstructing images from trichromatic samples: from basic research to pratical applications", *Proceedings of the 3rd IS &T/SID Color Imaging Conference*, 1995, Scottsdale, AZ, pp. 4-10.

Brainard, D.H. et al., "Bayesian Color Constancy", *Journal of Optical Society of America A*, 1997, 14, 1393-1411.

Kimmel, R. "Demosaicing: Image Reconstruction from Color CCD Samples", *IEEE Trans. On Image Processing*, Oct. 5, 1999, 1-16.

Pei, S.C. et al., "Effective Color Interpolation in CCD Color Filter Array Using Signal Correlation", *Image Processing*, 2000, 3, 488-491.

Taubman, D. "Generalized Wiener Reconstruction of Images from Colour Sensor Data using a Scale Invariant Prior", *IEEE Signal Processing Society*, 2000, International Conference on Image Processing (Sep. 10-13, 2000) The Vancouver Convention and Exhibition Center, Vancouver, BC, Canada.

* cited by examiner

*Primary Examiner*—Bravesh M. Mehta
*Assistant Examiner*—John Strege
(74) *Attorney, Agent, or Firm*—Woodcock Washburn LLP (57) ABSTRACT

Demosaicing of graphical content is provided. In an illustrative implementation a demosaicing engine executing one or more demosaicing algorithms is employed to operate on graphical content to provide better quality and higher resolution images. In operation, the demosaicing engine operates in two modes, a training/learning mode, and a run time mode. During training, training-images are analyzed to generate a codebook of mosaic filter table entries, such that each table entry has an associated list of similar training pixel blocks and their associated filters. During run time, a run-time image is broken into pixel blocks. Each pixel block is then compared with the entries of the codebook to find the closest match filter. The list associated with the entry is then processed using a least-squares algorithm to locate the optimal mosaic filter. As a result, higher resolution is achieved without requiring more pixels.

13 Claims, 5 Drawing Sheets

DEMOSAICING GRAPHICAL CONTENT

FIELD OF THE INVENTION

This invention relates in general to the field of image processing. More particularly, this invention relates to demosaicing image content using digital filters in an effort to improve the overall resolution and viewing quality of the image content.

BACKGROUND OF THE INVENTION

Graphical content and digital processing advances have paved the path for the design, development, and implementation of a myriad of products and systems that improve our ability to manage, store, and display various digital content. From basic high-resolution thin-profile graphics displays to pocket-size high-resolution digital cameras, today's graphics processing products and systems are capable of providing better quality and better resolution graphics to the benefit of content providers and content consumers alike. The proliferation of high-resolution consumer digital cameras, both video and still digital cameras, is evidence of the impact of these advances and provides additional evidence of a need among consumers for products that are capable of generating, managing, and displaying high quality and high resolution digital images.

Generally, digital cameras operate much like a standard film camera in the aperture, shutter, and lens functions. However, the key to digital image capture is in the CCD, or charge-coupled-device, which acts as the digital "film." The digital camera also maintains one or more processors that execute one or more graphics processing algorithms that operate on captured images to display and store them. In operation, a digital camera automatically sets the focus and exposure level required to capture a desired image. The exposure level is necessary, for like film, there is a saturation point for a CCD reached when the photodiode electron capture wells are filled. Capture is a fairly mechanical step, as the shutter is open long enough for the CCD to be bombarded with photons before further processing occurs. The CCD quantizes the image by virtue of a limited number of photodiode cells, or pixels, available to capture the photons. Current cameras have varying numbers of pixels (e.g. 1 million to 4.3 million pixels) and may have varying numbers of CCDs (e.g. one CCD to three CCDs).

The key concept of current digital cameras is that the CCD does not see color. On the contrary, it only keeps a rough count of how many photons have hit a particular point on the CCD. To make the CCD capture color images, the camera employs one or more demosaicing algorithms to recover a full image from a color mosaic image that is created by (e.g. Bayer mosaic) placing a color filter array over the CCD. With this filter, only red, green, or blue (RGB) light reached any given pixel on the CCD. The Bayer pattern is described more fully in U.S. Pat. No. 3,987,065 and is herein incorporated by reference in its entirety. The Bayer pattern attempts to simulate natural human visual response with alternating rows of RGRG and BGBG. In this way, roughly 25 percent of the pixels of any given captured image are red, 25 percent are blue, and 50 percent are green. The green emphasis is due to the increased sensitivity of the human eye to green light.

Specifically, in the Bayer mosaic, every red pixel is surrounded by four greens and four blues. Every blue pixel is surrounded by four greens and four reds. Every green pixel has two adjacent reds and two adjacent blues. Image demosaicing interpolates the colors using these neighboring pixels. Stated differently, red pixels have red and need green and blue. The four surrounding greens are averaged to provide a green value, while the four surrounding blues are averaged to provide a blue value. The same occurs for blue pixels. Green pixels, on the other hand, take an average of only two pixels each for red and blue pixels. In this manner, a typical 8-bit mosaic is transformed into a 24-bit image. This technique may work well for gradual changes but tends to introduce artifacts at the edges or at areas of great changes.

As a result of current demosaicing approaches, such as the Bayer demosaic, a bit of deception is introduced. That is the actual captured resolution is much less than the resolution claimed (e.g. 3.2 mega pixels). The red image is ¼ of the claimed resolution, as id the blue, while the green image is ½ of the claimed resolution. The final images is an interpolated combination of the three. There is further loss of resolution resulting from the display capacities of the digital camera itself (e.g. a digital camera may claim to provide an image having a resolution of 2.13 mega pixels where the output images are of 1600×1200 resolution, a mere 1.92 mega pixels). The resolution loss may be attributed to a property of the CCD that limits it as strict photon capture device. As stated each pixel/cell on the CCD sees one specific color and performs a sort of 'count' of photons by converting photons to storage charge, the color resolution of captured images is then a mere interpolation of the filters provided for the CCD. Further, the number of electrons collected at each pixel is linearly dependent on light level and exposure time, and nonlinearly dependent on wavelength. This adds more strain to the resolution output of such cameras.

Current practices attempt to address the limitations of current digital cameras by performing digitization, enhancement, and demosaicing of captured images. However, as stated, current demosaicing practices do not provide a basis to significantly enhance the image quality and image resolution.

From the foregoing, it is appreciated that there exists a need for a system and methods that ameliorate the shortcomings of existing practices.

SUMMARY

A system and methods to demosaic graphical content is provided. In an illustrative implementation, the system employs a demosaicing engine that operates on graphical content (e.g. digital image) to produce better quality and high resolution images without requiring a greater number of pixels. In operation, the demosaicing engine operates in two modes, a training/learning mode and a run-time mode. In the training/learning mode, the demosaicing engine creates/generates a library of image filters by analyzing a set of images. These filters are generated by analyzing a pre-defined pixel block from a particular training image. The pixel block is selected and processed using one or more generally available vector quantization algorithms (e.g. K-means algorithm) to determine if the given pixel block from the training image is unique or is to be associated with similar previously processed pixel blocks. The pixel block is then stored as an association to a filter table entry in a codebook for use during run time.

During run-time mode, the demosaicing engine analyzes an image to break it down into predefined pixel blocks. The pixel blocks are then compared with the stored pixel blocks in the codebook to find the closest match generally. A least-squares algorithm is then run on the associated list to generate the best mosaic filter to be applied to the run-time pixel block. The filter is generated using conventional techniques such as the Bayer mosaic filter process.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF AN
ILLUSTRATIVE IMPLEMENTATION

Overview

Usage of digital cameras is spreading widely as they are convenient image input devices. The increasing popularity of digital cameras has provided motivation to improve all elements of the digital photography signal chain. To lower cost, digital color cameras typically use a single image detector. Color imaging with a single detector requires the use of a Color Filter Array (CFA) which covers the detector array. In this arrangement each pixel in the detector samples the intensity of just one of the many color channels.

Single-sensor digital cameras spatially sample the incoming image using a color filter array (CFA). Consequently, each pixel only contains a single color value. In order to reconstruct the original full-color image, a demosaicing step must be performed which interpolates the missing colors at each pixel. Goals in CFA demosaicing include color fidelity, spatial resolution, no false colors, no jagged edges, and computational practicality. Most demosaicing algorithms do well for color fidelity, but there is often a trade-off between a sharp image and the so-called "zipper effect" or jagged edge look.

The recovery of full-color images from a CFA-based detector requires a method of calculating values of the other color channels at each pixel. These methods are commonly referred as color interpolation or color demosaicing algorithms. Goals in color demosaicing include color fidelity, spatial resolution, no false colors or color fringe, no jagged edges, and computational practicality. Many algorithms have been proposed over the years, ranging from simple linear algorithms to sophisticated adaptive ones that usually require some local feature detections. Though adaptive algorithms are generally believed to outperform non-adaptive algorithms in terms of the quality of color reproduction, the performance gain often comes at the expense of tougher system computational requirements which imposes challenges in hardware implementations and prevents its use in certain applications such as real-time high speed imaging.

On the other hand, simple algorithms such as the popular bilinear interpolation are very computationally efficient, but they don't bring good tradeoffs between the sharpness and the so-called "zipper effect" or jagged edge look of the image. This motivates the search for simple and efficient algorithms that balance sharpness and complexity.

The system and methods described herein aim to ameliorate the shortcomings of existing practices and surmount existing challenges resultant from such practices by offering a comprehensive demosaicing engine that operates one ore more adaptive demosaicing algorithms without requiring significant additional computational resources and that do not require additional processing hardware.

Furthermore, it is appreciated that although the systems and methods described herein are described in context of a digital camera that the use of a digital camera is merely exemplary as the inventive concepts disclosed herein apply to various digital content image capture devices including but not limited to image scanners, image copiers, and the like.

Exemplary Computing Environment

Figure 1:
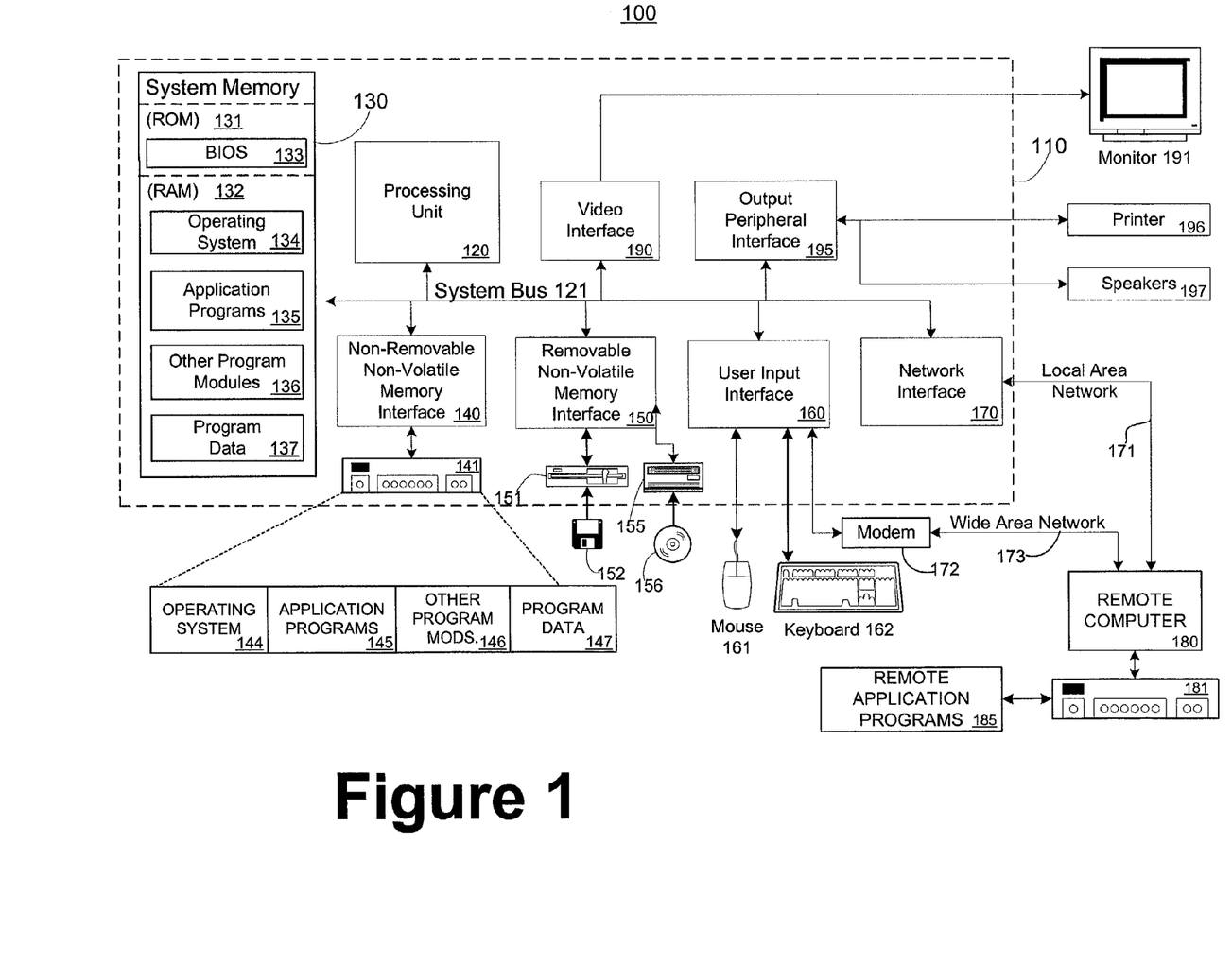
FIG. 1 is a block diagram showing an exemplary computing environment for use by the systems and methods described herein.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 2:
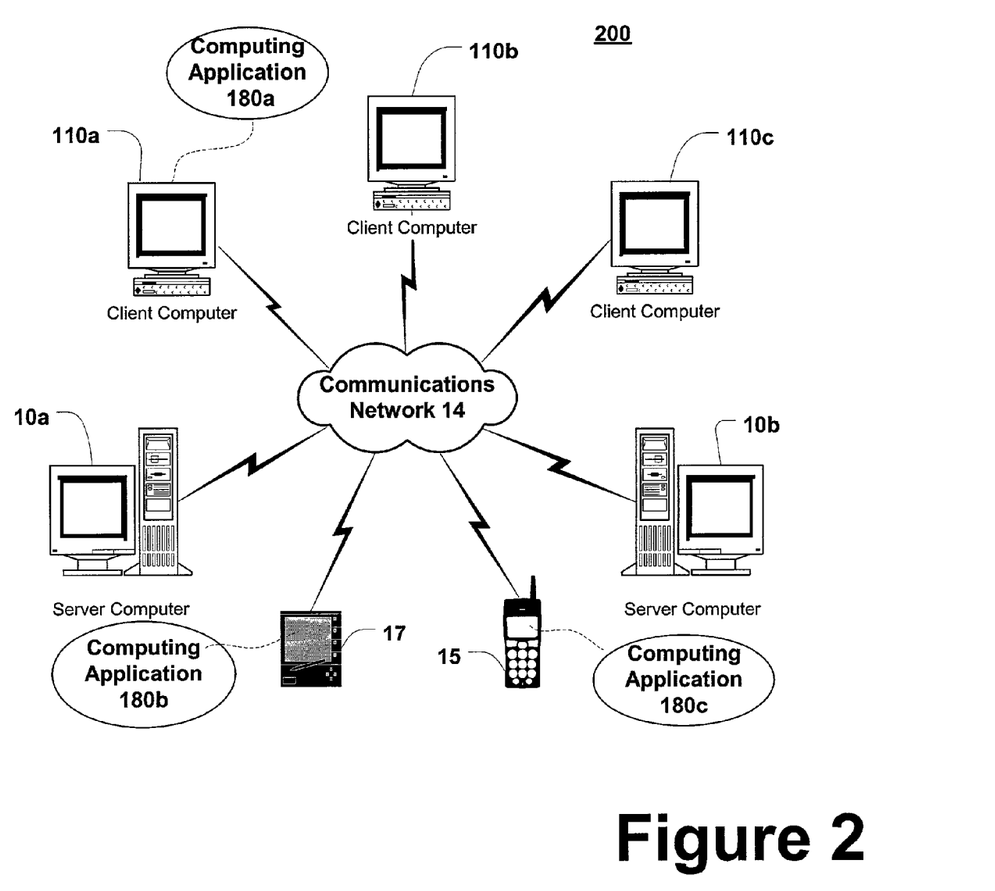
FIG. 2 is a block diagram showing an exemplary computer network environment for use by the systems and methods described herein.

FIG. 2 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, etc., such as a portable computer, handheld computer 17, mobile telephone 15, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, etc. communicate via any of a number of known protocols such as hypertext transfer protocol (HTTP). Communications may be wired or wireless, where appropriate. Client devices 10 may or may not communicate via communications network 14, and may have independent communications associated therewith. For example, in the case of a TV or VCR, there may or may not be a networked aspect to the control thereof. Each client computer 110 and server computer 10 may be equipped with various application program modules 180 and with connections or access to various types of storage elements or objects, across which files may be stored or to which portion(s) of files may be downloaded or migrated. Any server 10a, 10b, etc. may be responsible for the maintenance and updating of a database (not shown) in accordance with the systems and methods described herein, such as a database (not shown) for storing classification information, music and/or software incident thereto. Thus, the present invention can be utilized in a computer network environment having client computers 110a, 110b, etc. for accessing and interacting with a communications network 14 and server computers 10a, 10b, etc. for interacting with client computers 110a, 110b, etc. and other devices 15 and 17 and databases (not shown).

Generally, communications network 14 comprises any of a wireless LAN, a fixed wire LAN, a wireless WAN, a fixed wire WAN, a wireless intranet, a fixed wire intranet, a wireless extranet, a fixed wire extranet, a wireless peer-to-peer communications network, a fixed wire peer-to-peer communications network, the wireless Internet, and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of .NET's languages and services, and in other distributed computing frameworks as well.

Demosaicing Graphical Content

Figure 3:
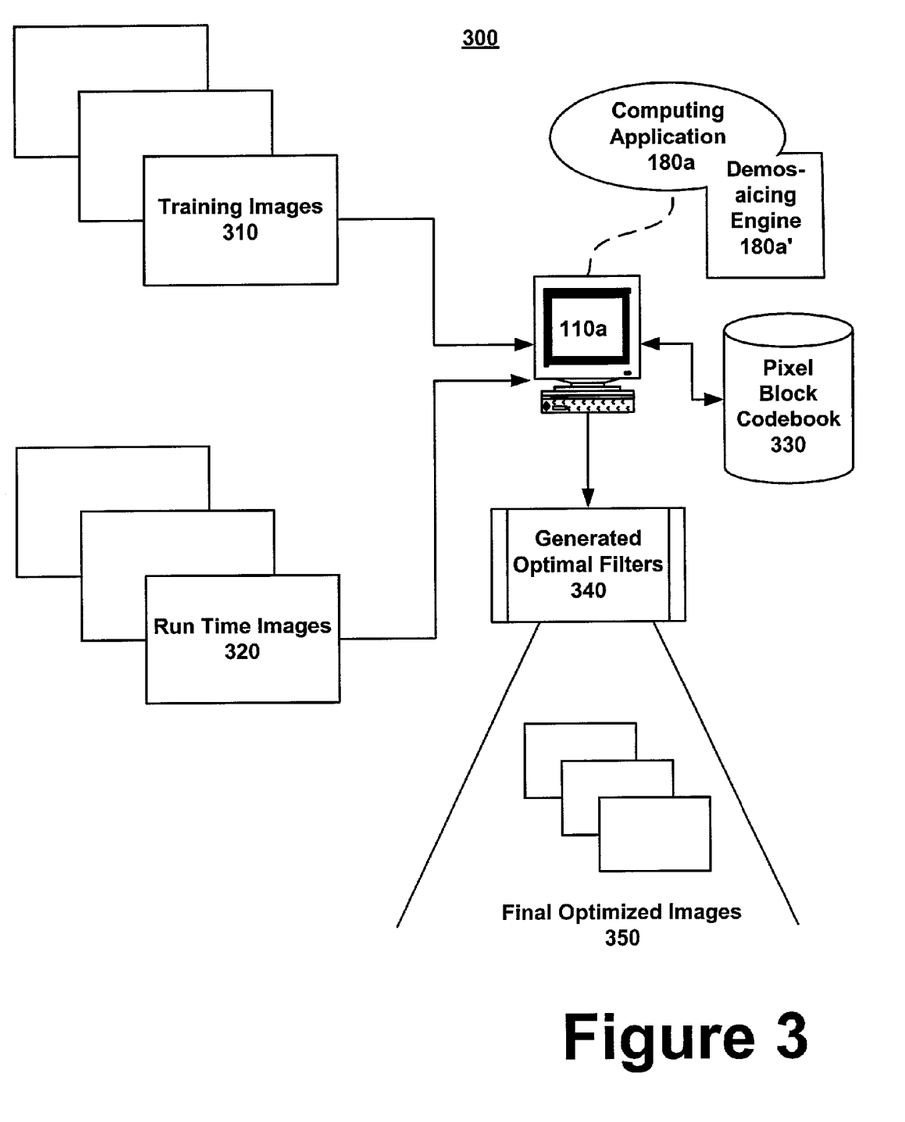
FIG. 3 is a block diagram showing the interaction of exemplary components of a demosaicing system operating in a an exemplary computer environment.

FIG. 3 shows the interaction between exemplary components of demosaicing system 300 that operates on digital graphical content to provide better quality and higher resolution images. As shown, an exemplary computing application 180a operating on an exemplary computing device 110a may offer demosaicing engine 180a' that cooperates with pixel block codebook 330 to generate filters 340, using information garnered from training images 310, for application to run time images 320 so to generate final optimized images 350. Specifically, demosaicing engine 180a' operates to analyze pixel blocks from training images 310 to generate pixel block codebook 330. Pixel block codebook 330 contains, inter alia, pixel block table entries that have associated lists of similarly matched pixel blocks. In operation, run time images are processed by demosaicing engine 180a' to break them down into pixel blocks. For each identified run-time pixel block, each run-time pixel block is then compared with the pixel block codebook 330 store to identify the closest match table entry. The list associated with the closest match table entry is then processed according to at least one generally available averaging algorithm to produce optimal filters 340. The generated optimal filter is then applied to the identified run time pixel block. A filter is generated for each of the identified pixel block of each run-time image. The filters are then applied to their respective run-time pixel blocks from their respective run-time images to create final optimized images 350. As more run-time images are processed by the demosaicing engine, the larger the pixel block codebook becomes and more relevant filters generated.

Figure 4:
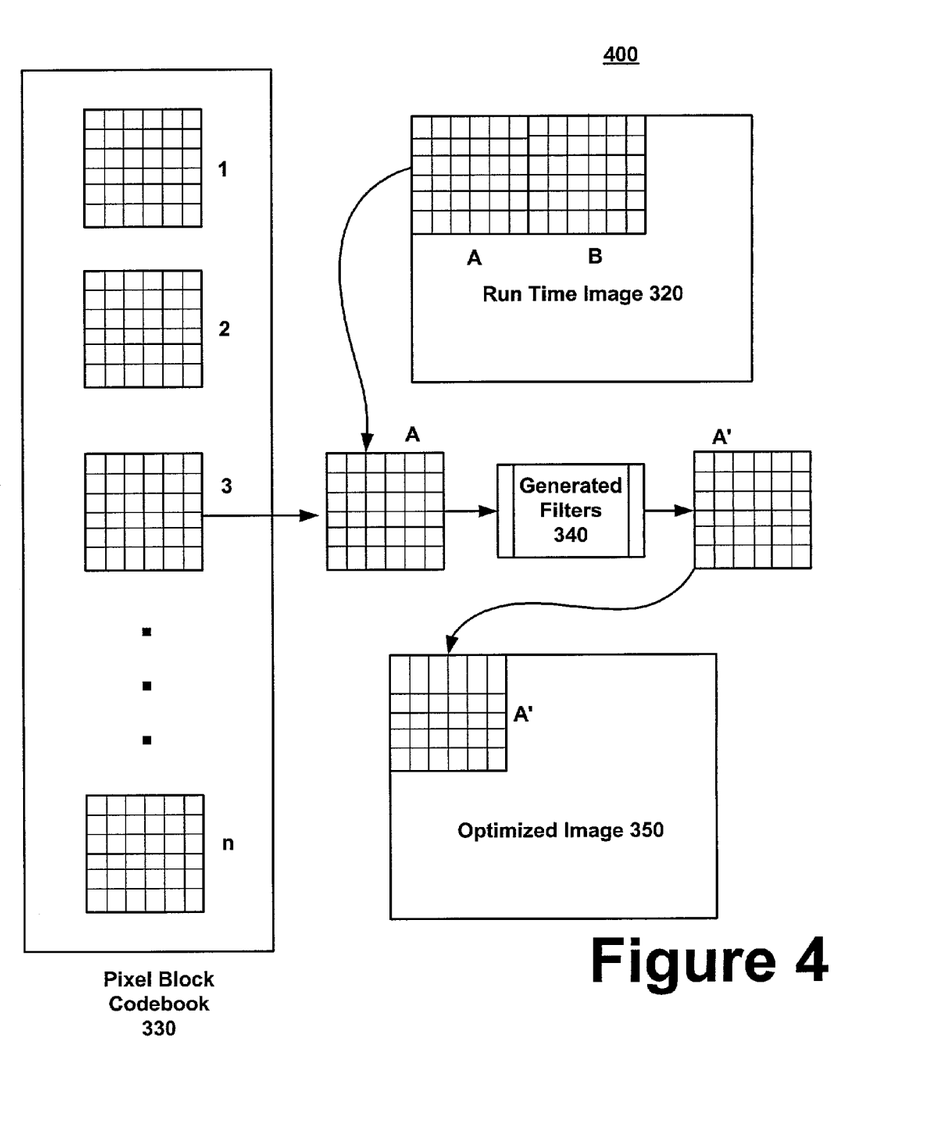
FIG. 4 is a block diagram showing the operation of demosaicing in accordance with the systems and methods described herein when demosaicing an exemplary image.

FIG. 4 shows a block representation of demosaicing operation 400 on a exemplary runtime image 320. Run-time image 320 is comprised of many pixel blocks A, B, etc. It is appreciated that although a 6×6 pixel block is shown in the illustrative implementation, that the pixel block is merely illustrative, as the systems and methods described herein contemplate the use of various pixel blocks having symmetric and asymmetric configurations. As shown demosaicing operation 400 starts with the identification of a pixel block A from run-time image 320. Pixel block A is then compared with the table entries of pixel block codebook 330 to find the closest match entries. Although not shown, pixel block codebook 330 contains table entries where each entry has an associated list of similar pixel blocks. The table entry associated list is then processed by the demosaicing engine (not shown) to generate filters 340. The process of generating filters 340 involves the use of one or more averaging algorithms (e.g. least square algorithm) as applied as part of any generally available demosaicing algorithm (e.g. Bayer demosaicing algorithm described in U.S. Pat. No. 3,987,065). Demosaicing engine (not shown) produces a filter A' for application to pixel block A of run-time image 320. The resultant optimized image 350 then contains filtered pixel block A' where pixel block A would have resided. This processing is repeated for each pixel block of run-time image 320.

Figure 5:
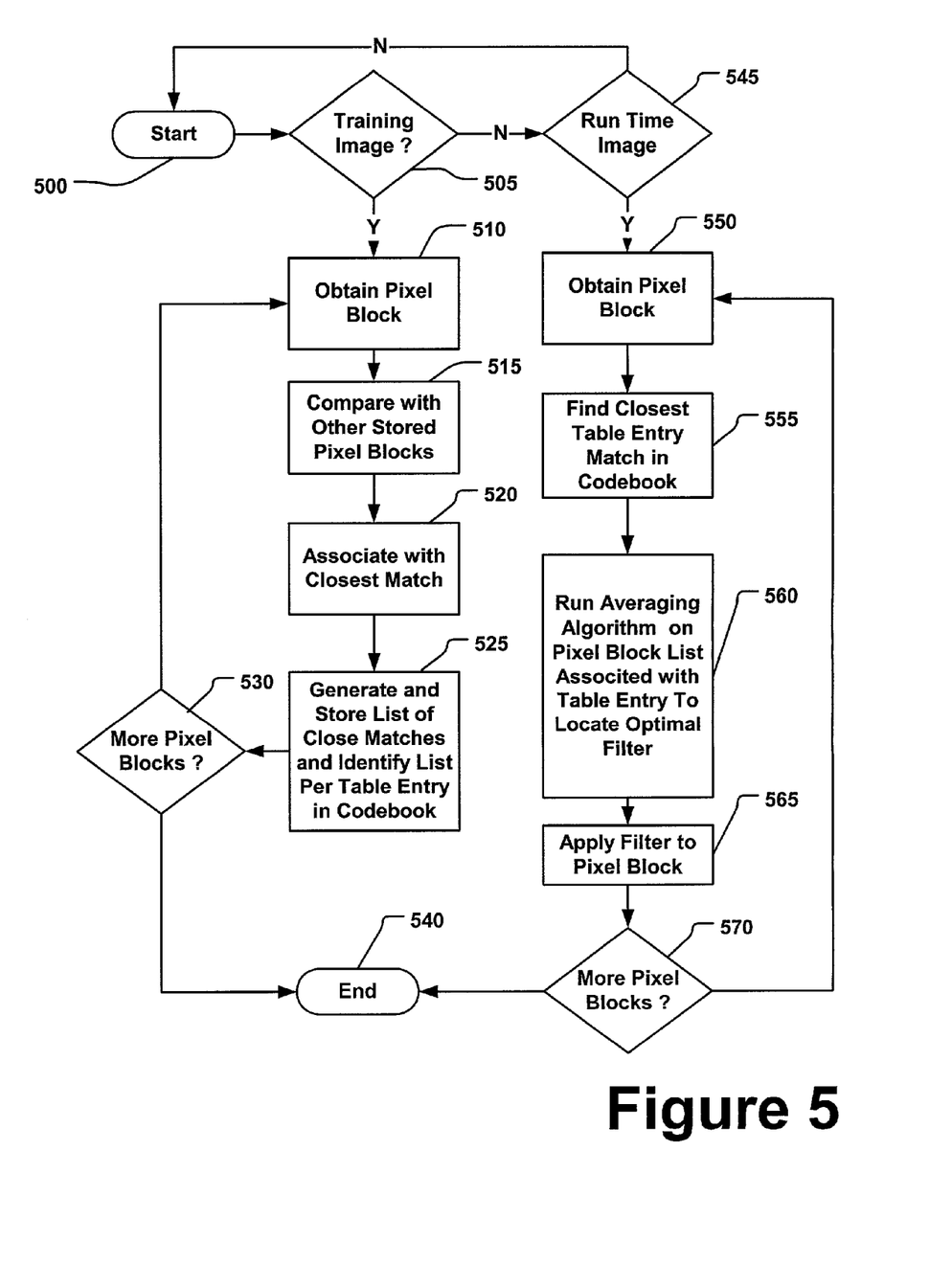
FIG. 5 is a flow diagram showing the processing performed when demosaicing an image in accordance with the systems and methods described herein.

FIG. 5 shows the processing performed when demosaicing an exemplary image. As shown, processing begins at block 500 and proceeds to block 505 where a check is performed to determine if the image being processed is a training image. If it is a training image, processing proceeds to block 510 where a pixel block from the training image is obtained. The obtained pixel block is then compared with other pixel blocks at block 515 and then associated with the closes match at block 520. From there processing proceeds to block 525 where a list of close matches is generated and stored per table entry in a cooperating codebook. A check is then performed at block 530 to determine if there are any additional pixel blocks from the training image that require processing. If there are processing reverts to block 510, however, if there are no more training image pixel blocks, processing terminates at block 540.

However, if at block 505, it is determined that it is not a training image, a check is then performed to determine if it is a run-time image. If it is a run-time image, processing proceeds to block 550 where a run-time image pixel block is obtained. The closest table entry match is then found at block 555. From there, an averaging algorithm (e.g. least squares algorithm) is performed as part of a demosaicing algorithm (e.g. Bayer algorithm) on the obtained run-time image pixel block match list associated with the table entry from the pixel block codebook to create filter for the run-time pixel block. The generated filter is then applied to the obtained run-time pixel block. A check is then performed at block 570 to determine if there are additional pixel blocks in the run-time image that require processing. If there are, processing reverts to block 550. If there are no more pixel blocks that require processing, processing terminates at block 540.

If at block 545, however, it is determined that the image is not a run-time image, processing reverts to block 500 and proceeds there from.

As mentioned above, while illustrative implementations of the systems and methods described herein have been described in connection with various computing devices and network architectures, the underlying concepts may be applied to any computing device or system in which it is desirable to perform and execute debugger causality. Thus, the techniques for debugger causality in accordance with the systems and methods described herein may be applied to a variety of applications and devices. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the web page content protection aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the content protection capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the illustrative implementations of the various figures, it is to be understood that other similar implementations may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the systems and methods described herein may be implemented in or across a plurality of processing chips or devices, and storage may similarly be effected across a plurality of devices. Therefore, the systems and methods described herein should not be limited to any single implementation, but rather should be construed in breadth and scope in accordance with the appended claims.

What is claimed is:

1. A system to demosaic graphical content comprising:
an interface, said interface capable of accepting graphical content;
a graphical content codebook, said graphical content codebook containing at least one table entry representative of a list of identified similar pixel blocks; and
a demosaicing engine, said demosaicing engine cooperating with said interface and said graphical content codebook, to analyze graphical content by dividing said graphical content into at least one pixel block and comparing said at least one pixel block of said graphical content with said pixel blocks of said graphical content codebook to find the list having the closest match between said at least one pixel block of said graphical content and said pixel blocks of said list of said graphical content codebook and performing an averaging algorithm on said list having said closest match to produce a demosaicing filter for application to said at least one pixel block of said graphical content.

2. The system as recited in claim 1, wherein said graphical content comprises digital images captured by a digital camera.

3. The system as recited in claim 1, wherein said demosaicing engine comprises a computing application operating in a computing environment.

4. The system as recited in claim 1, wherein said interface comprises a digital content capture device.

5. The system as recited in claim 1, wherein said codebook comprises a data store having at least one table entry for storing said lists containing said similar pixel blocks.

6. The system as recited in claim 1, wherein said graphical content codebook is generated by analyzing a set of training images.

7. The system as recited in claim 6, wherein said training images are broken down into pixel blocks that are stored in lists associated with at least one table entry in a cooperating data store.

8. The system as recited in claim 7, wherein similarly situated pixel blocks are stored in said lists.

9. The system as recited in claim 7, wherein said codebook is generated using a K-means algorithm.

10. The system as recited in claim 1, wherein said demosaicing engine further stores said at least one pixel block of said graphical content in said codebook such that said at least one pixel block of said graphical content is stored in the list having the closest match between said at least one pixel block of said graphical content and said pixel blocks of said list of said graphical content codebook.

11. The system as recited in claim 1, wherein said averaging algorithm comprises a least-square averaging algorithm.

12. A method to perform demosaicing of captured digital content comprising the steps of:
providing a demosaicing engine;
training said demosaicing engine, wherein a codebook of values having lists of best-matched pixel blocks is generated from the analysis of training images; and
executing said demosaicing engine on run-time images, wherein the demosaicing engine breaks down a run-time image into pixel blocks and compares the pixel blocks with the generated codebook of values to find best matched pixel block for each of the broken run-time image pixel blocks and wherein the list having the best matched pixel block is averaged to generate the optimal filter for each of the broken down run time pixel blocks.

13. A method to perform demosaicing of captured digital content comprising the steps of:
providing an interface, said interface capable of accepting graphical content;
providing a graphical content codebook, said graphical content codebook containing at least one table entry representative of a list of identified similar pixel blocks; and
providing a demosaicing engine, said demosaicing engine cooperating with said interface and said graphical content codebook, to analyze graphical by dividing said graphical content into at least one pixel block and comparing said at least one pixel block of said graphical content with said pixel blocks of said graphical content codebook to find the list having the closest match between said at least one pixel block of said graphical content and said pixel blocks of said list of said graphical content codebook and performing an averaging algorithm on said list having said closest match to produce a demosaicing filter for application to said at least one pixel block of said graphical content.

* * * * *